(12) United States Patent
Hui

(10) Patent No.: US 7,804,208 B2
(45) Date of Patent: Sep. 28, 2010

(54) METHOD AND STRUCTURE FOR COOLING AN ELECTRIC MOTOR

(76) Inventor: Wing-kin Hui, Unit A, 8/F Hing Win Industrial Bldg, 110 How Ming Street, Kwun Tong, Hong Kong (HK)

( * ) Notice: Subject to any disclaimer, the term of this patent is extended or adjusted under 35 U.S.C. 154(b) by 300 days.

(21) Appl. No.: 11/956,683

(22) Filed: Dec. 14, 2007

(65) Prior Publication Data

US 2009/0152964 A1 Jun. 18, 2009

(51) Int. Cl.
*H02K 9/28* (2006.01)
*H02K 9/04* (2006.01)

(52) U.S. Cl. .............................. 310/57; 310/62; 310/63; 310/227

(58) Field of Classification Search ............. 310/57–59, 310/61–65, 89, 227
See application file for complete search history.

(56) References Cited

U.S. PATENT DOCUMENTS

| | | | | |
|---|---|---|---|---|
| 3,486,055 A | * | 12/1969 | Lipstein ...................... | 310/227 |
| 3,791,774 A | * | 2/1974 | Vonk ........................ | 417/423.2 |
| 4,092,556 A | | 5/1978 | Mabuchi ..................... | 310/63 |
| 4,266,152 A | | 5/1981 | Herr et al. ................... | 310/59 |
| 4,331,209 A | | 5/1982 | Bauer et al. .................. | 180/5.4 |
| 4,626,720 A | | 12/1986 | Fukasaku et al. ............. | 310/62 |
| 5,053,657 A | | 10/1991 | Ikegami et al. ............... | 319/63 |
| 5,283,493 A | | 2/1994 | Hokanson et al. ........... | 310/227 |
| 5,425,345 A | * | 6/1995 | Lawrence et al. ......... | 123/559.1 |
| 5,714,810 A | | 2/1998 | Yuhi et al. .................... | 310/40 |
| 6,257,359 B1 | * | 7/2001 | Granlund et al. ........... | 180/68.1 |
| 6,703,730 B2 | | 3/2004 | Hayashi ....................... | 310/62 |
| 7,042,121 B2 | | 5/2006 | De Filippis et al. | |
| 2004/0263008 A1 | * | 12/2004 | Voigt et al. ................... | 310/58 |
| 2006/0022529 A1 | | 2/2006 | De Filippis et al. ........... | 310/58 |

FOREIGN PATENT DOCUMENTS

| | | | |
|---|---|---|---|
| CN | 2208753 | | 9/1995 |
| JP | 2004153892 A | * | 5/2004 |
| JP | 020044153892 A | | 5/2004 |
| WO | WO 9904479 A1 | * | 1/1999 |

* cited by examiner

*Primary Examiner*—Tran N Nguyen
(74) *Attorney, Agent, or Firm*—Peninsula IP Group; Douglas Chaikin

(57) ABSTRACT

A high speed electric motor for use in a variety of applications. The electric motor an electric motor including a motor housing or stator, a rotor having a commutator and brushes for contacting the commutator at a predefined area known as the contact area. Additionally, the motor includes a forced air cooling assembly. The forced air cooling assembly includes a centrifugal fan for creating air flow, a manifold for accelerating the air flow. The manifold having exit ports and the exit ports being positioned directly over the contact area for directing the accelerated air flow at the contact area and the motor housing having at least one opening aligned with the contact area and at least a second opening defining an exit vent. Additionally, a method of cooling the motor in accordance with the invention is also disclosed.

13 Claims, 5 Drawing Sheets

METHOD AND STRUCTURE FOR COOLING AN ELECTRIC MOTOR

FIELD OF THE INVENTION

This invention generally relates to the field of brushed electrical motors. More particularly, this invention relates to small, high speed electric motors which include structure for internal cooling.

BACKGROUND OF THE INVENTION

Electric motors are in widespread use for a seemingly never ending variety of tasks. Such motors are popular because they are small and powerful. Additionally, there is virtually zero pollution and generally speaking the motors run far more quietly than other motors, such as an internal combustion engines (ICEs). Many industries rely solely upon such electrical motors to power their devices. For example, pool cleaners are virtually exclusively powered by such motors. As will be appreciated, in order to make such devices practical, the motors must be quite small and very powerful. Such motors are required to rotate at extremely high speed and are placed in a confined spaces. As will be readily understood the physical limitations of such spaces and the high speed of the motors means that heat build up can be extreme, especially when such motors are put to constant and heavy usage.

The two weakest points to such small high speed electric motors in a confined space are heat which catastrophically damages the copper windings of the motors and dust or particulate matter build up on the commutator, especially at the contact area between the brushes and the commutator which likewise causes catastrophic failure. Heat causes the copper wiring of the armature to become so hot it fails to function and then fails catastrophically so that the motor is permanently damaged and needs to be replaced. Thus, heat is the primary enemy of such motors and there is a long felt need to cool such motors.

Next is dust or particulate matter. For example, most brushes are made of graphite. Contact between the brushes and the commutator is required to complete the electromagnetic circuit and thus essential for motor operation in a brushed motor environment. As the brushes contact the commutator, wear occurs and very fine graphite particles, dust, in fact, escape into the air and also build up on the commutator at the contact area between the commutator and the brushes. When enough such particulates build up on the commutator, the brushes will fail to complete the electromagnetic circuit and the motor will no longer operate.

Clearly no motor lasts forever. However, in the case of brushed electromagnetic motors it would approach optimum if the motor life could be extended at least as long as the brush life. In practice, it has been found that typically first, the copper wire fails cutting motor life as the result of excess heat. And, subsequently, should the user be able to get by copper wire failure, dust or particulate build up, especially from graphite dust, similarly causes catastrophic and permanent failure.

As stated above, there is a long established need to cool electrical motors. This is especially true for brushed electrical motors, which are subject to long continuous and constant usage on a daily basis. In fact, a quick review of the US/PTO records shows that there are over a hundred references concerned with the cooling of electrical motors.

Most of the references found in the US/PTO are for liquid cooled devices. Typically, these devices are non-brushed motors such as induction motors. Non brushed motors are also known as brushless motors. Brushless motors do not require a brush nor do they require physical contact of the brush with the commutator in order to make electrical contact and cause the motor to operate. Brushless motors use a dielectric fluid as cooling media.

With respect to the brushed motors references, typically air is used the as cooling media. Typically, the brushed motor references related to cooling focus on improving cooling by integrating a heat sink on the motor housing. In virtually all cases disclosed, an axial fan is used to cool and is integrated as part of the motor or separately connected. Such an axial fan draws air and pushes air towards the motor housing and attempts to provide cooling. However, whether integrated or separated from the motor, an axial fan provides high air flow but low air pressure.

U.S. Pat. No. 7,042,121 discloses an electrical motor having a cooling air flow generated by a fan wheel and routed through ventilation openings of the motor housing. The motor further includes a heat sink and a fan to aide in additional cooling.

For example, U.S. Pat. No. 4,092,556 discloses a closed system for cooling an electric motor that includes a rotor, a stator and a commutator. The motor includes ducts, which have openings opposite the surface of contact of the brushes and the commutator. Air is forced through the ducts from the on either side of the rotor on the contact The fan from the air is directed through a cooling path by cooling elements and designed to increase cooling flow and add effective cooling to the motor. The cooling elements are external to the motor.

Thus what is needed is a motor which lasts as long as the brushes, while being able to provide high speed operation in a confined environment. As explained below, the instant invention provides an apparatus and method which provides adequate cooling to extend motor life through preservation of the cooper windings and by clearing the contact area of graphite build up.

SUMMARY OF THE INVENTION

A method and structure for cooling a small high powered electrical motor which includes the motor in accordance with the invention having cooling structure. The cooling structure provides forced and pressurized air at the area of contact between the brushes and the commutator. The air hits the commutator contact area with enough force to cool the copper wires and dislodge particulates, notably graphite particles from the contact area.

It is an object of this invention to provide a method and structure for cooling a small high powered electrical motor.

It is an additional object of this invention to provide such a method and structure for cooling a small high powered electrical motor which dislodges graphite particles from the contact area between the brushes and commutator extends the life of the brushes.

It is an additional object of this invention to provide a method and structure for cooling a small high powered electrical motor which extends the life of the motor by extending the life of the brushes.

The motor in accordance with this invention employs a centrifugal fan to compress and blow air towards the commutator. In one exemplary embodiment, the fan comprises an impeller. The impeller forces the air flow towards the armature and in particular toward the contact area. Forced air cools as it passes through motor housing and along the heat generating components. Particularly, the forced and pressurized air flows past the heat generating components including the brush, the commutator, and copper windings as well as the armature causing cooling as it goes.

Additionally, the air flow is of sufficient strength and pressure to dislodge particulates. Particularly, the brushes of such motors are made of graphite. Small bits of graphite defining dust particles cause build up on the contact area. By providing such a flow of air that dislodges particulates, including graphite dust from the contact area, particulate build up at the contact area is discouraged, if not eliminated. Additionally, it will be appreciated that a commutator having a dirty contact area will lower the motor efficiency. Further, such a dirty contact area will likely generate extra heat due to a partial shorting of the circuit between the commutator and the brushes.

In accordance with one exemplary embodiment of the motor of the invention, which comprises:

an electric motor having a motor housing, a stator, a rotor having a commutator and brushes for contacting the commutator at the contact area;

a forced air cooling assembly including:

a fan for creating air flow;

a manifold for accelerating the air flow;

the manifold have exit ports and the exit ports being positioned directly over the contact area for directing the accelerated air flow at the contact area; and the motor housing having a plurality of opening; at least one opening aligned with the contact area and at least a second opening defining an exit vent.

In another exemplary embodiment, the electrical motor in accordance with the invention includes a manifold having two impeller exit ports which are opposed from one another and having contact area intakes and they, too, are opposed from one another.

It is an advantage of this invention to provide such a electrical motor which increases motor life in a confined environment.

BRIEF DESCRIPTION OF THE DRAWING

For a further understanding of the objects and advantages of the present invention, reference should be had to the following detailed description, taken in conjunction with the accompanying drawing, in which like parts are given like reference numerals and wherein.

DETAILED DESCRIPTION OF THE INVENTION

Figure 1:
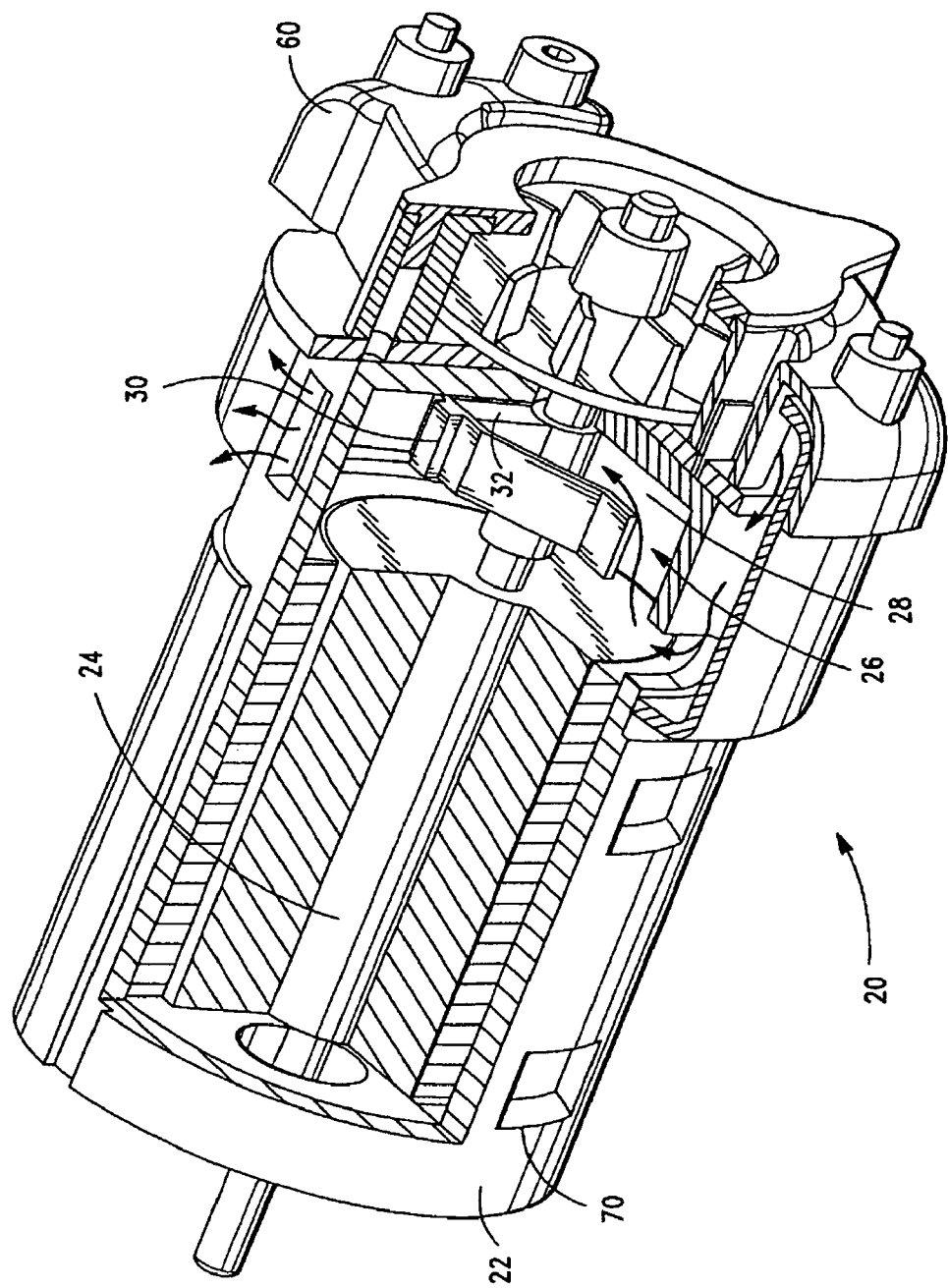
FIG. 1 is a partially cut away perspective view of the electrical motor in accordance with this invention.

An exemplary embodiment of the electric motor in accordance with the present invention generally denoted by the numeral 20 will now be described with reference to FIG. 1. The motor 20 includes a stator 22 or housing, an armature 24 or rotor and a brush assembly, generally denoted by the numeral 26.

The armature 24 includes a commutator 28. Typically, the commutator 28 uses copper segments. However, more modern examples of the commutator 28 include graphite segments.

The brush assembly 26 includes a brush holder 30 for holding a brush 32 against the commutator 28. The area which the brush 32 contacts the commutator 28 is called the contact area.

The brush holder 30 holds the brush 32 in place and provides electrical insulation from the housing when the rotor is activated. Supplying power to the motor causes the brush 32 in contact the commutator 28 at the contact area to complete the electrical circuit and cause the armature to rotate.

Figure 2:
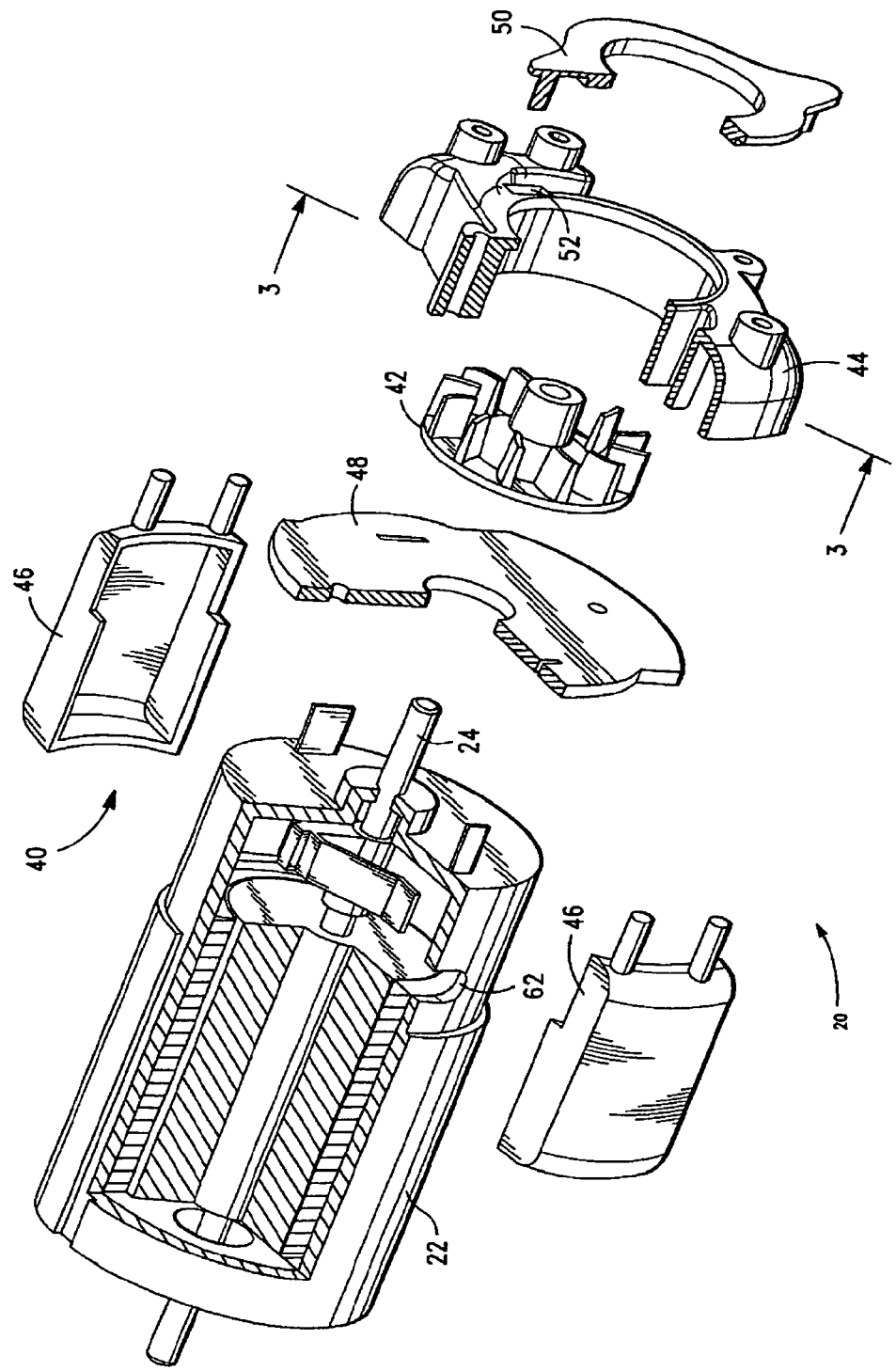
FIG. 2 is a partially exploded view of the electrical motor in accordance with this invention showing detail of one exemplary manifold.

The exemplary embodiment 20 further includes a forced air cooling assembly generally denoted by the numeral 40 (FIG. 2). The forced air assembly includes a fan defining an impeller 42, a manifold 44 and vent shafts 46.

A partition 48 separates the impeller 42 from the motor housing 22. The partition 48 in an exemplary embodiment is made of plastic. In another embodiment, the partition 48 is made from a printed circuit board (PCB). Using this embodiment of the partition 48, motor leads are connected the PCB. Additionally, the partition 48 of this embodiment because it is a PCB is attached directly to the motor housing.

The impeller 42 is mounted on the rotor 24 and separated from the motor housing 22 by the partition 48. The manifold 44 is mounted over the impeller 42 and onto the partition 48. It will be appreciated that since the manifold 44 is mounted over the impeller 42, the inside opening of the manifold 44 is larger than the impeller 42. This allows pre-assembly of the motor before the installing the impeller 42.

The manifold 44 is fixed to the partition 48 and immobile thereto by a locking member 50. The locking member 50 includes a male member 54 which is threaded through an aperture 52 n the manifold 44. The male member 54 locks into the partition 48 holding manifold 44 in place. Additionally, the locking member 50 is used to close the inlet to the manifold 44 as appropriate.

Figure 3:
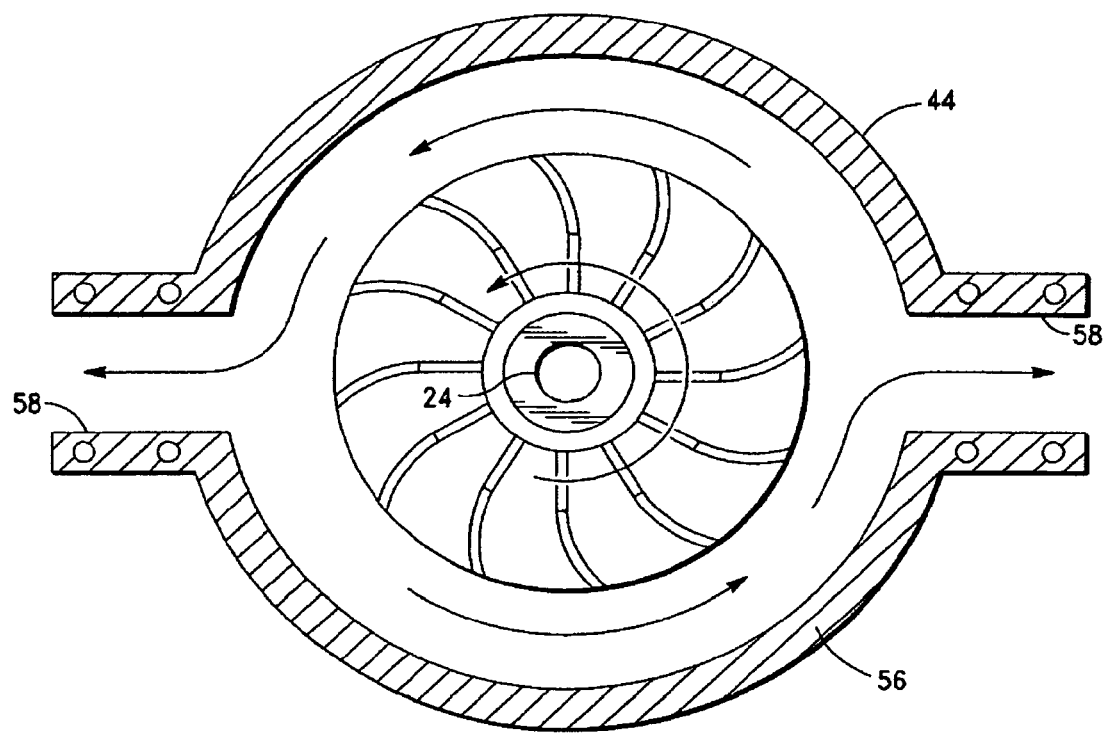
FIG. 3 is an enlarged cross sectional view of the reverse side of the manifold of the electrical motor in accordance with this invention.

As shown in FIGS. 2 and 3, the manifold 44 includes a collar 56. The collar 56 has impeller exit ports 58. As the impeller rotates, it creates a stream of air which is forced out the exit ports 58. The forced air travels at an accelerated rate of speed through the vent shafts 46 as a result of being circulated first through the manifold 44.

The accelerated air flow is also pressurized as a result of the high speed of the impeller 42 and as a result of being forced through exit ports 58. The pressurized air flow enters the side vents 46 and then flows through to the housing 22.

The housing 22 has a plurality of openings. At least one of one of the openings, opening 62 is positioned directly adjacent the contact area and defines an intake port for directing the air flow to the contact area. In the exemplary embodiment shown in FIG. 2, the opening is shaped as a slot and acts to further direct the air flow toward the contact area.

In another embodiment, the impeller 42 is offset from the motor rotor. In this embodiment, the air blows directly onto the motor housing 22 without additional manifold or vents. Since the impeller 42 is offset, a set of pulleys and gears is used to power the impeller 42.

It will be appreciated that in one exemplary, the opening 62 is positioned directly adjacent the contact area. However, as will be appreciated the intake port may be located somewhat differently within the spirit and scope of the invention. It will be appreciated that the only limitation is that there be an air flow with sufficient force to cool the motor parts and dislodge graphite and other particulates from the commutator.

Figure 4:
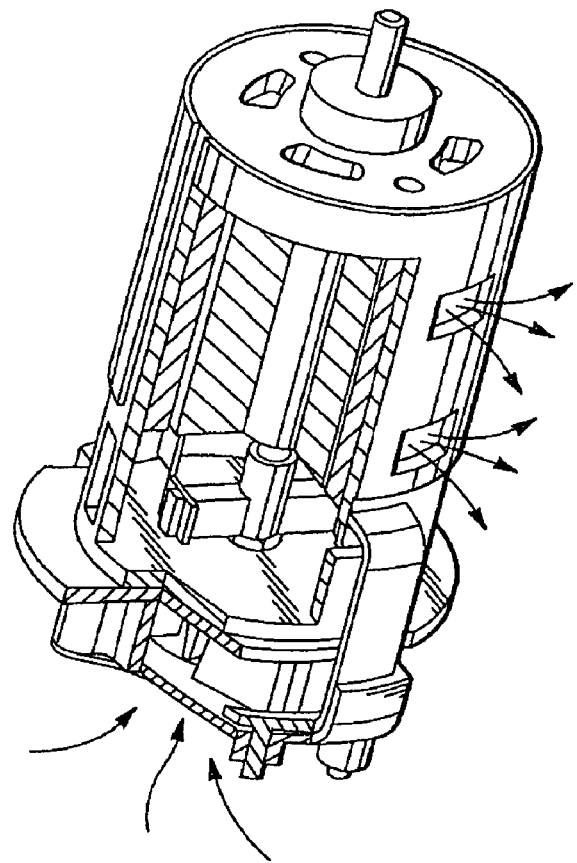
FIG. 4 illustrates the air flow from the impeller to the exit vents in the motor housing in accordance with electrical motor of this invention.
Figure 4:
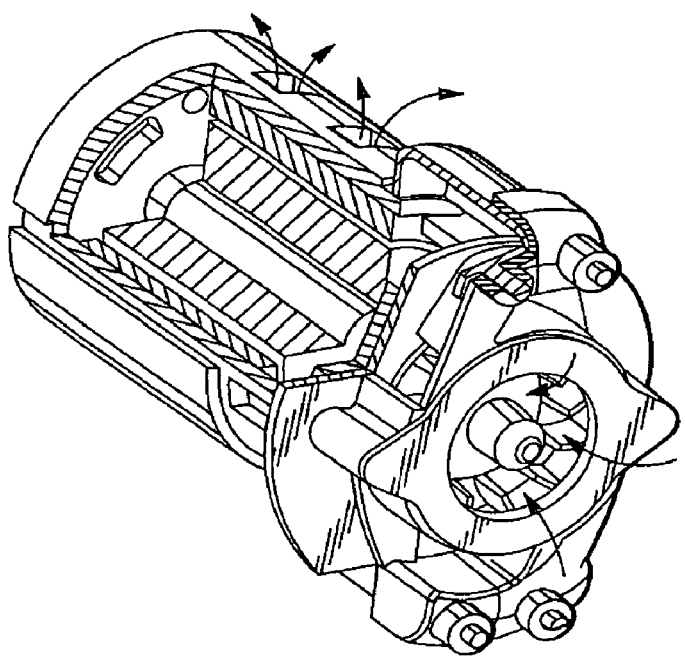
Figure 5:
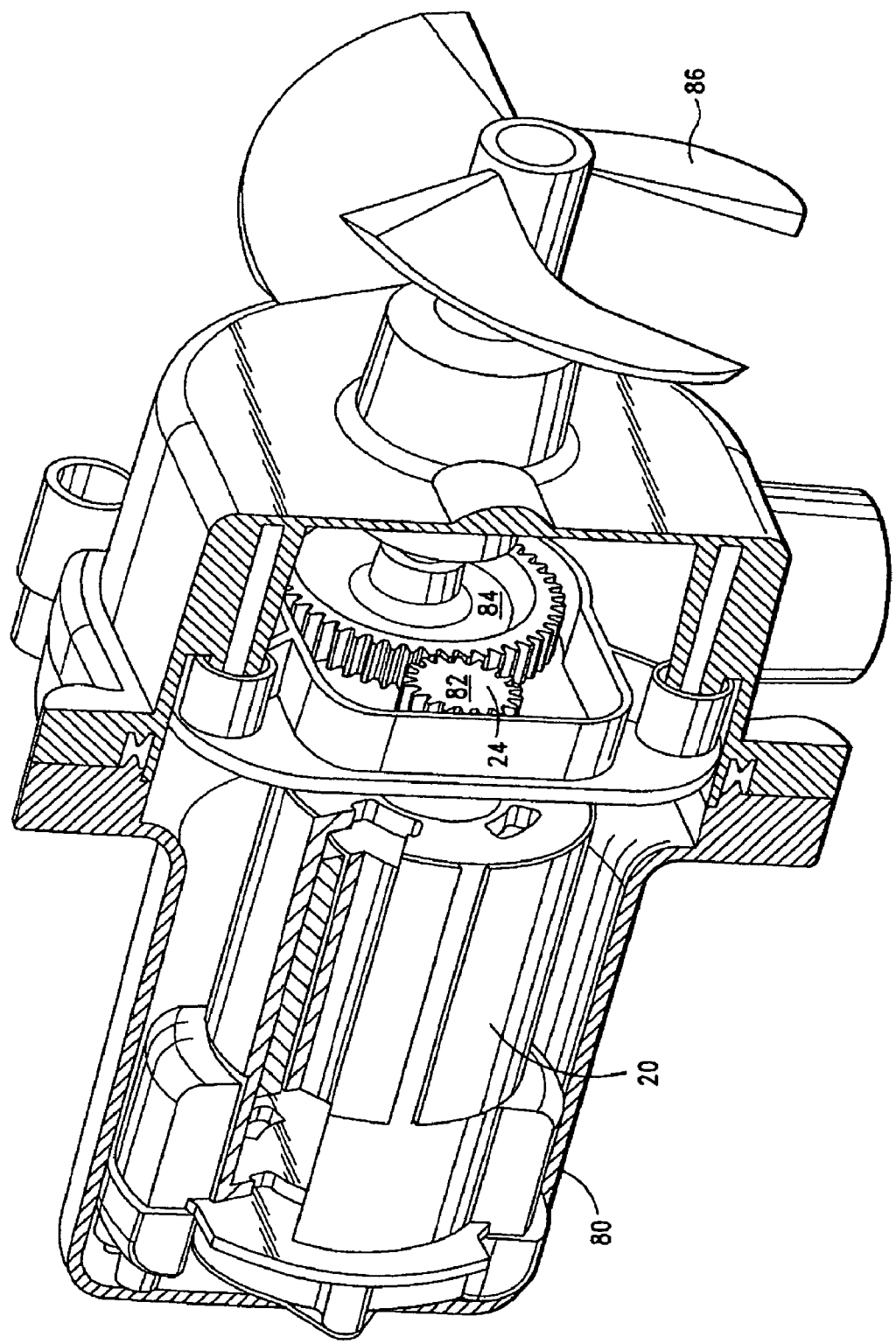
FIG. 5 illustrates the electrical motor of this invention in use.

With respect to FIGS. 4 & 5, there is shown the air flow pattern including the direction. Upon cooling the motor parts, e.g. the copper wiring and the commutator, especially at the contact area and dislodging particulates from the commutator contact area, the air flow exits the motor housing 22. The air flow exits through vents 70.

In the exemplary embodiment illustrated in FIG. 2, there are two vents 70. However, it will be appreciated that the number of vents is not critical as long as the air flow is vented thoroughly through the housing 22. There must be sufficient venting to a allow a continuous flow of pressurized air through the motor housing 22.

With respect to FIG. 5, there is shown an exemplarily embodiment of the motor 20 in accordance with the invention in use. The motor 20 in this application is encased in a water tight housing 80. The rotor 24 includes a gear 82, which rotates as the motor 20 rotates. The gear 82, in the instant application acts as a pinion gear and in turn rotates gear 84 which in turns rotates propeller 86 in use with a pool cleaner, for example, the propeller is used to move the pool cleaner vehicle along the underwater surfaces of the pool.

While the foregoing detailed description has described several embodiments of the electrical motor in accordance with this invention, it is to be understood that the above description is illustrative only and not limiting of the disclosed invention. Particularly, there can be a variety of intake ports and exit vents that are all within the spirit and scope of this invention. It will be appreciated there are also various impeller type fans that are suitable for use in the exemplary embodiments discussed above and that there are numerous embodiments that are not mentioned but within the scope and spirit of this invention. Thus, the invention is to be limited only by the claims as set forth below.

What is claimed is:

1. A small, high powered, electrical motor having forced air cooling, comprising:
   an electric motor having a motor housing, a stator, a rotor having a commutator and brushes for contacting the commutator defining a contact area;
   a forced air cooling assembly including:
      a fan for creating air flow;
      a manifold for accelerating the air flow;
      the manifold having exit ports and the exit ports being positioned directly over the contact area for directing the accelerated air flow at the contact area;
      the motor housing having a plurality of opening; at least one opening aligned with the contact area and at least a second opening defining an exit vent; and
      the manifold includes a collar connected to one end of the motor housing and a passageway defining a vent shaft for delivering the air flow created by the fan from manifold exit port to the contact area intake.

2. The electrical motor of claim 1, wherein the fan for creating the air flow defines an centrifugal fan.

3. The electrical motor of claim 2, wherein the fan for creating the air flow defines an impeller.

4. The electrical motor of claim 3, wherein the impeller creates the air flow and the manifold pressurizes and accelerates the air flow.

5. The electrical motor of claim 4, wherein the impeller is attached to the rotor and rotates as the motor rotates forcing pressurized air through the manifold and onto the contact area.

6. The electrical motor of claim 3, wherein the manifold defines at least one an impeller exit port and at least one contact area intake for directing air flow directly onto the contact area.

7. The electrical motor of claim 6, wherein the manifold has two exit ports and they are opposed from one another.

8. The electrical motor of claim 7, wherein the manifold has two contact area intakes and they are opposed from one another.

9. The electrical motor of claim 8, wherein the two manifold exit ports are 180 degrees opposed and the two contact area intakes are also 180 degrees opposed from one another.

10. The electrical motor of claim 9, wherein one pair of manifold exit ports and contact area intakes are in-line with one another and 180 degrees opposed to the other port and intake pair.

11. The electrical motor of claim 3, wherein one end of the vent shaft is positioned and is in open communication with the manifold exit port and the other end of the vent shaft is in open communication with the contact area intake.

12. The electrical motor of claim 3, wherein impeller is offset from the rotor, and the impeller is powered by a set of gears and a pulley connected to the rotor.

13. The electrical motor of claim 1, wherein the vent shaft is attached removably to the collar.

* * * * *